United States Patent
Nonaka et al.

(10) Patent No.: US 7,958,519 B2
(45) Date of Patent: Jun. 7, 2011

(54) RECORDING MEDIUM CHANGER

(75) Inventors: Wataru Nonaka, Tokyo (JP); Hideaki Noguchi, Kanagawa (JP); Akira Iseki, Kanagawa (JP)

(73) Assignee: Sony Corporation (JP)

(*) Notice: Subject to any disclaimer, the term of this patent is extended or adjusted under 35 U.S.C. 154(b) by 240 days.

(21) Appl. No.: 12/384,759

(22) Filed: Apr. 8, 2009

(65) Prior Publication Data

US 2009/0260026 A1    Oct. 15, 2009

(30) Foreign Application Priority Data

Apr. 11, 2008 (JP) ............... P2008-103910

(51) Int. Cl.
*G11B 17/04* (2006.01)
(52) U.S. Cl. ............... 720/615
(58) Field of Classification Search ......... 369/30.67, 369/30.66, 30.75, 30.43; 360/92.1; 720/615, 720/630, 645, 617, 718, 734
See application file for complete search history.

(56) References Cited

U.S. PATENT DOCUMENTS

| | | | | |
|---|---|---|---|---|
| 6,112,276 | A * | 8/2000 | Hunt et al. | 711/112 |
| 6,241,453 | B1 * | 6/2001 | Upmeyer | 414/667 |
| 7,072,995 | B1 * | 7/2006 | Burroughs | 710/16 |
| 2003/0189811 | A1 * | 10/2003 | Peeke et al. | 361/685 |

FOREIGN PATENT DOCUMENTS

| | | |
|---|---|---|
| JP | 60256971 A | 12/1985 |
| JP | 63241755 A | 10/1988 |
| JP | 05-325361 A | 12/1993 |
| JP | 06-139686 A | 5/1994 |

OTHER PUBLICATIONS

Office Action from Japanese Application No. 2008-103910, dated Feb. 18, 2010.

* cited by examiner

*Primary Examiner* — Allen T Cao
(74) *Attorney, Agent, or Firm* — Lerner, David, Littenberg, Krumholz & Mentlik, LLP

(57) ABSTRACT

A recording medium changer includes a storage block that is movable in a longitudinal direction, a drive block that processes data recorded on a recording medium, a conveying block that is movable in a vertical direction and conveys the recording medium for mounting onto the drive block or for storage into the storage block, and a power supply block that supplies drive power to individual sections. The rear position of the storage block is present above the drive block, the driving delivery position of the conveying block is present forward of the drive block, the conveying block is present in the driving delivery position at the time of movement of the storage block in the longitudinal direction, and the storage block is present in the forward position when storage and ejection of the recording medium into and from the storage block are performed via an opening.

8 Claims, 17 Drawing Sheets

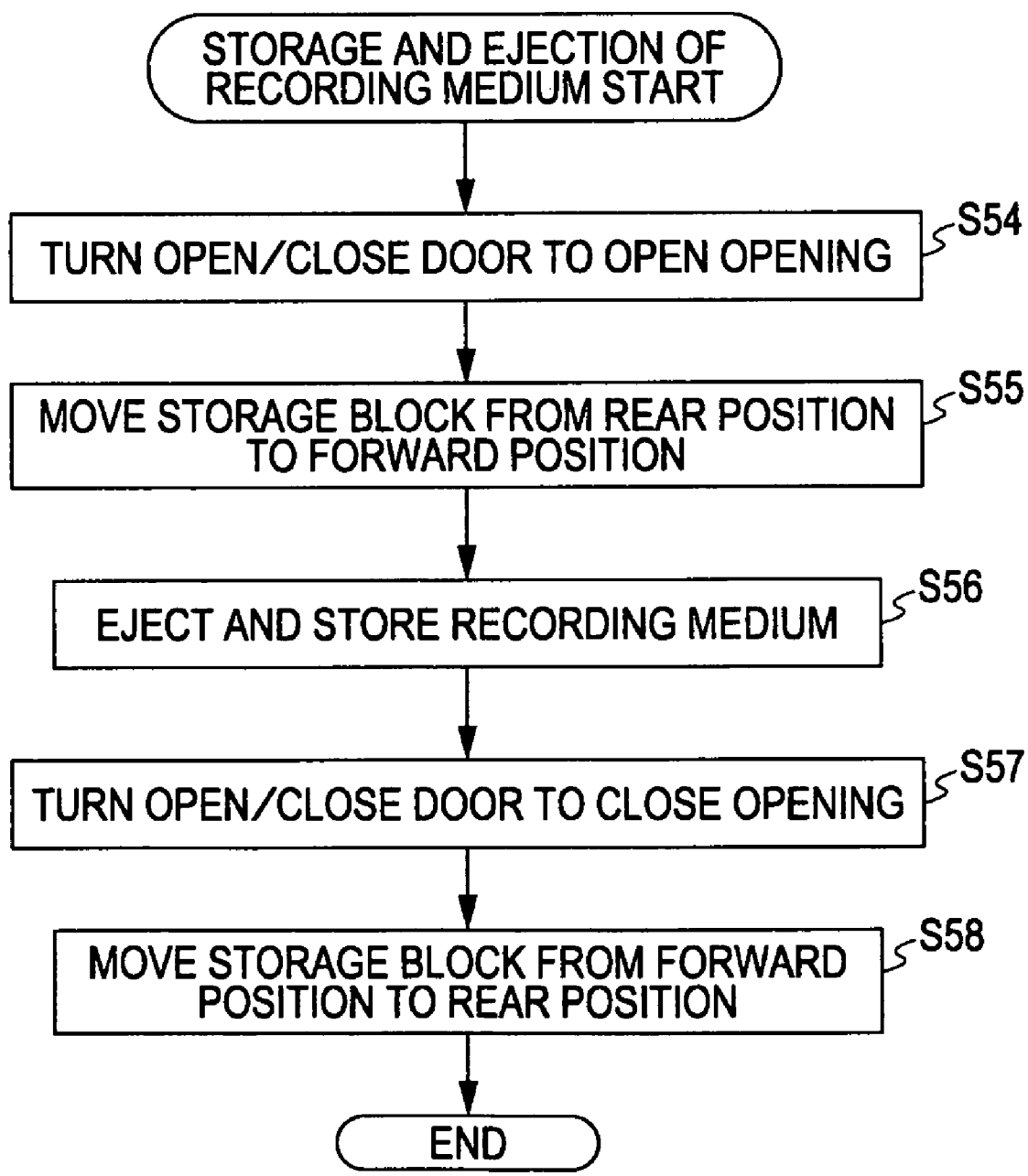

ID CHANGER

The present application claims priority from Japanese Patent Application No. JP 2008-103910, filed in the Japanese Patent Office on Apr. 11, 2008, the entire content of which is incorporated herein by reference.

BACKGROUND OF THE INVENTION

1. Field of the Invention

The present invention relates to the technical field of a recording medium changer. More specifically, the present invention relates to the technical field of improving workability by causing a storage block to be present in the forward position when storage and ejection of a recording medium into and from the storage block are performed via an opening formed in the front side portion of the outer casing.

2. Description of the Related Art

Recording medium changers exist which include a storage block having a plurality of storage shelves each storing a recording medium, for example, a disc-shaped recording medium such as an optical disc, eject a desired recording medium from the individual storage shelves by a conveying block and convey the ejected recording medium to a predetermined position, mount the conveyed recording medium onto a drive block by the conveying block, and perform such processing as playback or reading of data recorded on the mounted recording medium.

In some of these recording medium changers, the storage block, the conveying block, and the drive block are arranged inside the outer casing, and an opening is formed in the front side portion of the outer casing to allow storage and ejection of the recording medium into and from the storage block.

In the related art, there is a type of recording medium changer in which the storage block is arranged in a fixed state on the frontmost side, the conveying block is arranged so as to be vertically movable on the rear side of the storage block, and the drive block is arranged in a fixed state on the rear side of the storage block (see, for example, Japanese Unexamined Patent Application Publication No. 6-139686).

Also, in the related art, there is a type of recording medium changer in which the conveying block is arranged on the frontmost side so as to be vertically movable, the storage block is arranged on the rear side of the conveying block so as to be fixed on the upper side, and the drive block is arranged on the rear side of the conveying block in a fixed state below the storage block (see, for example, Japanese Unexamined Patent Application Publication No. 5-325361).

SUMMARY OF THE INVENTION

In the recording medium changer described in Japanese Unexamined Patent Application Publication No. 6-139686, the conveying block, the storage block, and the drive block are arranged in order from the front side to the rear side, with the result that the depth dimension becomes large, so the recording medium changer is enlarged in size.

In the recording medium changer described in Japanese Unexamined Patent Application Publication No. 5-325361, the storage block is present on the rear side of the conveying block. Thus, when trying to perform storage or ejection of a recording medium via the opening formed in the front side portion of the outer casing, the storage block is located distant from the opening, resulting in poor workability at the time of the storage and ejection work of a recording medium into and from the storage block.

It is thus desirable to achieve an improvement in workability at the time of the storage and ejection work of a recording medium into and from the storage block, while ensuring miniaturization.

According to an embodiment of the present invention, there is provided a recording medium changer including: an outer casing having in its front side portion an opening for storage and ejection of a recording medium; a storage block that has a plurality of storage shelves each storing the recording medium, and is movable in a longitudinal direction inside the outer casing; a drive block on which the recording medium is mounted and which processes data recorded on the recording medium; a conveying block that is movable in a vertical direction or in a lateral direction inside the outer casing, and ejects the recording medium from the storage block or the drive block and conveys the ejected recording medium for mounting onto the drive block or for storage into the storage block; and a power supply block that supplies drive power to at least individual sections arranged inside the outer casing. The storage block is moved between a forward position as a movable end on a forward side in a direction of movement where storage and ejection of the recording medium into and from each of the storage shelves are performed via the opening, and a rear position as a movable end on a rear side in the direction of movement, the conveying block is moved between a storage delivery position as a movable end on an upper side or on one lateral side in a direction of movement where delivery of the recording medium is performed between the conveying block and the storage block, and a driving delivery position as a movable end on a lower side or on the other lateral side in the direction of movement where delivery of the recording medium is performed between the conveying block and the drive block, the rear position of the storage block is present above or beside the drive block, the driving delivery position of the conveying block is present forward of the drive block, the conveying block is present in the driving delivery position at the time of movement of the storage block in the longitudinal direction, and the storage block is present in the forward position when storage and ejection of the recording medium into and from the storage block are performed via the opening.

Therefore, in the recording medium changer, at the time of storing and ejecting the recording medium into and from the storage block, the storage block is present in the forward position in a state in which the opening is open.

In the recording medium changer mentioned above, it is desirable that when the conveying block is present in the driving delivery position, the storage block be present in the forward position.

Since the storage block is present in the forward position when the conveying block is present in the driving delivery position, storage and ejection of the recording medium into and from the storage block can be performed at the time when the conveying block is present in the driving delivery position.

In the recording medium changer mentioned above, it is desirable that when the conveying block is present in the driving delivery position, the storage block be present in the forward position or in the rear position in accordance with a mode being set.

Since the storage block is present in the forward position or in the rear position in accordance with the mode being set, the position of the storage block in each mode can be optimized.

In the recording medium changer mentioned above, it is desirable that when processing of data recorded on the recording medium is being performed by the drive block, the storage block be present in the forward position, and that when delivery of the recording medium on which processing of data by the drive block has been completed is being performed between the drive block and the conveying block, the storage block be moved from the forward position to the rear position.

Since the storage block is present in the forward position when processing of data recorded on the recording medium is being performed, and the storage block is moved to the rear position when delivery of the recording medium is being performed between the drive block and the conveying block, at the time when the delivery of the recording medium between the drive block and the conveying block is finished, the storage block is present in the rear position.

In the recording medium changer mentioned above, it is desirable that when the conveying block has been moved from the storage delivery position to the driving delivery position, the storage block be moved from the rear position to the forward position.

Since the storage block is moved to the forward position when the conveying block has been moved to the driving delivery position, storage and ejection of the recording medium into and from the storage block can be performed when the conveying block is present in the driving delivery position.

In the recording medium changer mentioned above, it is desirable that delivery of the recording medium on which processing of data by the drive block has been completed from the drive block to the conveying block be performed during or before movement of the storage block from the forward position to the rear position.

Since delivery of the recording medium from the drive block to the conveying block is performed during or before the movement of the storage block to the rear position, when the storage block has been moved to the rear position, the recording medium has been delivered to the conveying block.

In the recording medium changer mentioned above, it is desirable that the recording medium changer further include an open/close door that is moved between an open position for opening the opening and a close position for closing the opening, and that the open/close door have a peek window that is located opposite the opening when in the close position.

Since the peek window is provided in the open/close door, the inside of the outer casing can be viewed when the open/close door is in the close position.

In the recording medium changer mentioned above, it is desirable that the recording medium changer further include lock means for restricting opening of the open/close door, the open/close door be locked in the close position when the storage block is present in the rear position, and that locking of the open/close door by the lock means be released when the storage block is present in the forward position.

Since the open/close door is locked in the close position when the storage block is present in the rear position, and locking of the open/close door is released when the storage block is present in the forward position, it is not necessary for the user to perform an operation related to locking in accordance with the position of the storage block.

The recording medium changer according to an embodiment of the present invention includes: an outer casing having in its front side portion an opening for storage and ejection of a recording medium; a storage block that has a plurality of storage shelves each storing the recording medium, and is movable in a longitudinal direction inside the outer casing; a drive block on which the recording medium is mounted and which processes data recorded on the recording medium; a conveying block that is movable in a vertical direction or in a lateral direction inside the outer casing, and ejects the recording medium from the storage block or the drive block and conveys the ejected recording medium for mounting onto the drive block or for storage into the storage block; and a power supply block that supplies drive power to at least individual sections arranged inside the outer casing. The storage block is moved between a forward position as a movable end on a forward side in a direction of movement where storage and ejection of the recording medium into and from each of the storage shelves are performed via the opening, and a rear position as a movable end on a rear side in the direction of movement, the conveying block is moved between a storage delivery position as a movable end on an upper side or on one lateral side in a direction of movement where delivery of the recording medium is performed between the conveying block and the storage block, and a driving delivery position as a movable end on a lower side or on the other lateral side in the direction of movement where delivery of the recording medium is performed between the conveying block and the drive block, the rear position of the storage block is present above or beside the drive block, the driving delivery position of the conveying block is present forward of the drive block, the conveying block is present in the driving delivery position at the time of movement of the storage block in the longitudinal direction, and the storage block is present in the forward position when storage and ejection of the recording medium into and from the storage block are performed via the opening.

Therefore, since the storage block, the conveying block, and the drive block are not arranged side by side along the longitudinal direction, miniaturization of the recording medium changer can be achieved. In addition, since the storage block is present in the forward position at the time when storage and ejection of the recording medium into and from the storage block are performed, it is possible to achieve an improvement in workability at the time of the storage and ejection work of the recording medium into and from the storage block.

According to an embodiment of the present invention, the storage block is present in the forward position when the conveying block is present in the driving delivery position. Thus, storage and ejection of the recording medium into and from the storage block can be performed immediately, thereby achieving a reduction in the working time necessary for the ejection and storage work.

According to an embodiment of the present invention, when the conveying block is present in the driving delivery position, the storage block is present in the forward position or in the rear position in accordance with a mode being set. Thus, it is possible to achieve an improvement in usability according to the mode being set.

According to an embodiment of the present invention, when processing of data recorded on the recording medium is being performed by the drive block, the storage block is present in the forward position, and when delivery of the recording medium on which processing of data by the drive block has been completed is being performed between the drive block and the conveying block, the storage block is moved from the forward position to the rear position. Thus, it is possible to achieve a reduction in operating time through an improvement in operating efficiency.

According to an embodiment of the present invention, when the conveying block has been moved from the storage delivery position to the driving delivery position, the storage block is moved from the rear position to the forward position. Thus, ejection and storage of the recording medium from and into the storage block can be done with a short wait time, thereby achieving a reduction in working time.

According to an embodiment of the present invention, delivery of the recording medium on which processing of data by the drive block has been completed from the drive block to the conveying block is performed during or before movement of the storage block from the forward position to the rear position. Thus, it is possible to achieve a reduction in operating time through an improvement in operating efficiency.

According to an embodiment of the present invention, the recording medium changer further includes an open/close door that is moved between an open position for opening the opening and a close position for closing the opening, and the open/close door has a peek window that is located opposite the opening when in the close position. Thus, the state inside the outer casing can be viewed in a state with the open/close door located in the close position, thus allowing the current operating state to be checked easily.

According to an embodiment of the present invention, the recording medium changer further includes lock means for restricting opening of the open/close door, the open/close door is locked in the close position when the storage block is present in the rear position, and locking of the open/close door by the lock means is released when the storage block is present in the forward position. Thus, it is not necessary for the user to manually perform an operation related to locking in accordance with the position of the storage block, thus allowing for improved convenience.

BRIEF DESCRIPTION OF THE DRAWINGS

FIGS. 21A and 21B are each a flowchart showing an operation when Mode C is set.

DESCRIPTION OF THE PREFERRED EMBODIMENTS

Figure 1:
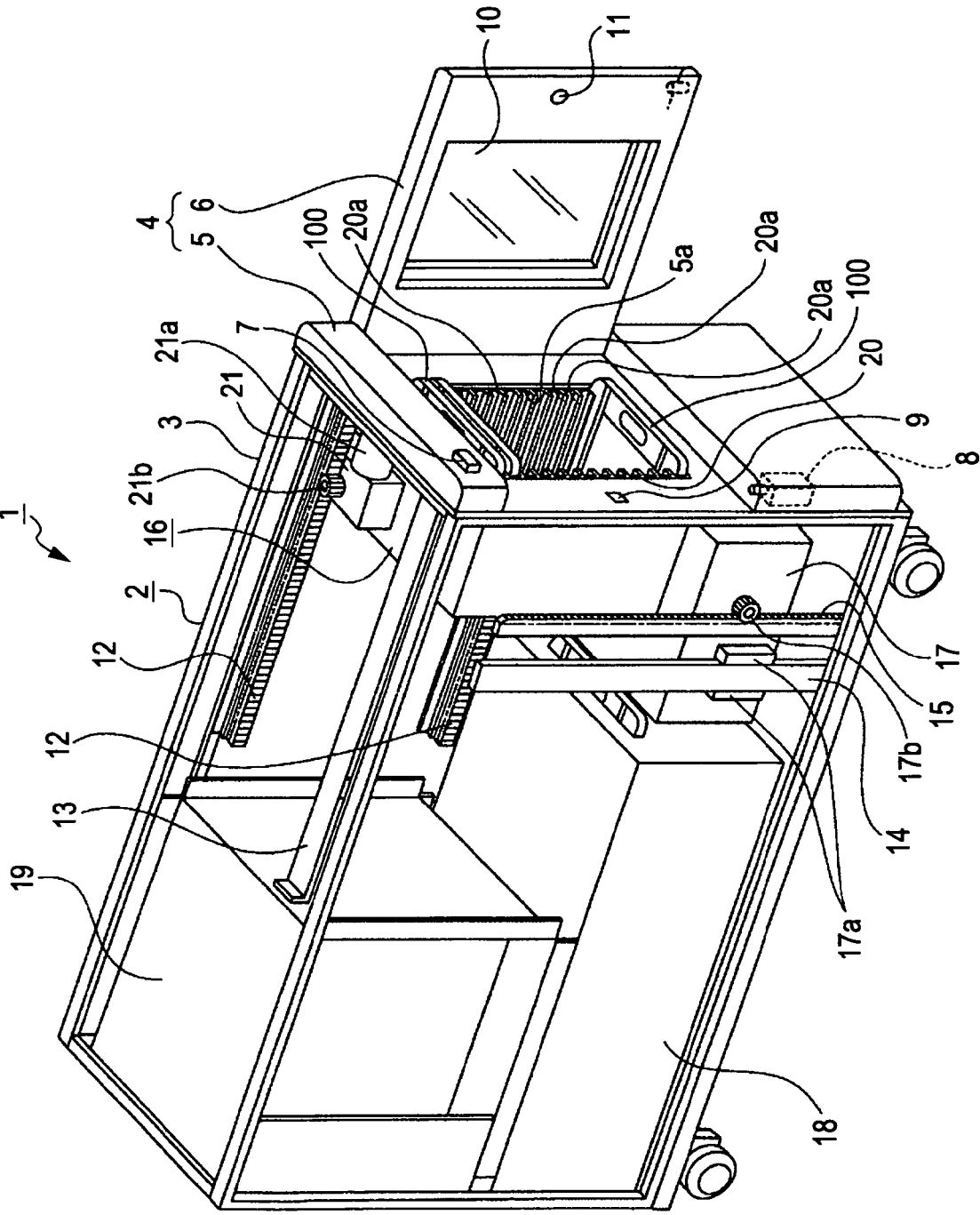
FIG. 1 is a schematic perspective view of a recording medium changer, illustrating a recording medium changer according to an embodiment of the present invention together with FIGS. 2 though 21B.

Hereinbelow, a recording medium changer according to an embodiment of the present invention will be described with reference to the attached drawings. In the following, the recording medium changer according to an embodiment of the present invention is applied to a disc changer that handles a disc-shaped recording medium as a recording medium.

The scope of application of the present invention is not limited to a disc changer. The present invention can be applied to a broad range of recording medium changers that handle various recording media such as a tape-shaped recording medium and a card-shaped recording medium.

As shown in FIGS. 1 through 4, a recording medium changer 1 has necessary individual sections arranged inside an outer casing 2.

The outer casing 2 includes a main body 3 that opens at the front, and a door member 4 that covers the front side of the main body 3.

The main body 3 is formed in a box-like shape. The door member 4 includes a door 5, and an open/close door 6 supported on the door 5 so as to turn freely.

The door 5 opens and closes the entirety of the opening at the front side of the main body 3, and is supported on the main body 3 so as to turn freely on its right end portion, for example. An opening 5a is formed in the upper half portion of the door 5.

In the door 5, an unlock button 7 is provided at the upper end portion, and a lock unit 8 is provided below the opening 5a. As the lock unit 8, a solenoid is used, for example. An adsorption section 9 formed of, for example, a magnetic metal material is provided beside the opening 5a (see FIG. 4).

The door 5 is fixed to the main body 3 with screws, for example. Thus, the door 5 becomes turnable with respect to the main body 3 by removing the screws. The door 5 is, for example, a door used when performing maintenance on individual sections arranged inside the outer casing 2. By turning the door 5 to open the front side of the main body 3, various kinds of work such as repair and adjustment of individual sections can be performed, allowing for improved ease of maintenance.

Figure 4:
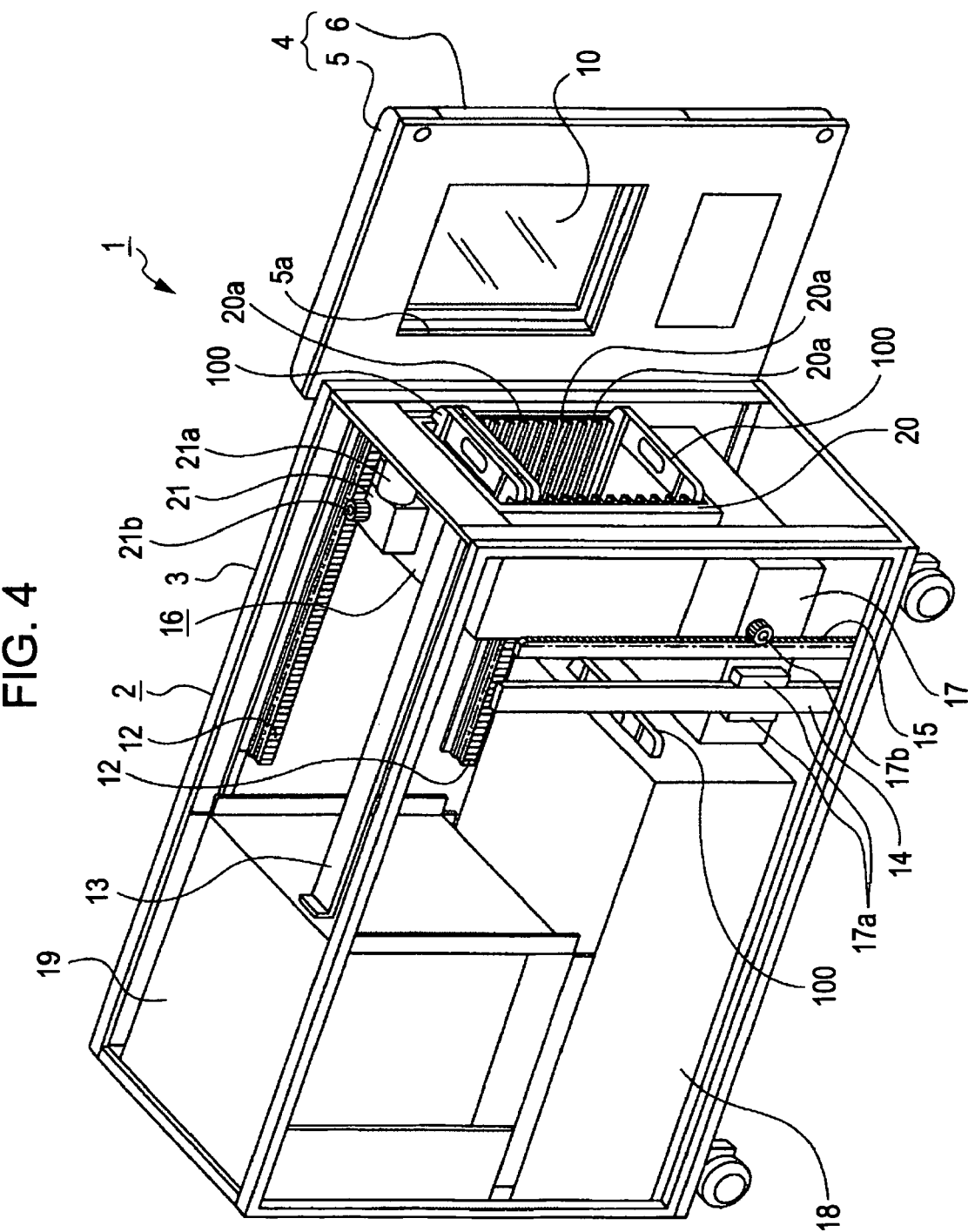
FIG. 4 is a schematic perspective view of the recording medium changer in a state when a door member is open.

A transparent peep window 10 is provided in the open/close door 6 (see FIGS. 1 and 4). The open/close door 6 can be turned between a close position for closing the opening 5a formed in the door 5, and an open position for opening the opening 5a.

The open/close door 6 is supported on the door 5 so as to turn freely on the right end portion, for example. An adsorbing magnet 11 for adsorbing the adsorption section 9 provided in the door 5 is provided on the back of the open/close door 6 (see FIG. 4). Accordingly, as the adsorption section 9 is adsorbed by the adsorbing magnet 11, the open/close door 6 closes the opening 5a in the close position.

When the open/close door 6 is in the close position, the peep window 10 is located opposite the opening 5a of the door 5 (see FIG. 1).

When the open/close door 6 is in the close position, the open/close door 6 can be locked by the lock unit 8. Also, the locking of the open/close door 6 in the close position can be released by an operation on the unlock button 7.

As shown in FIGS. 1 through 4, on the inner surface at the right side of the main body 3, two first conveyance racks 12 that extend longitudinally are attached so as to be vertically spaced apart from each other. A longitudinally extending guide rail 13 is attached on the inner surface at the top side portion of the main body 3.

On the inner surface at the left side of the main body 3, a guide member 14 and a second conveyance rack 15 that extend vertically are attached so as to be longitudinally spaced apart from each other.

A storage block 16, a conveying block 17, a drive block 18, and a power supply block 19 are arranged inside the outer casing 2.

The storage block 16 has a storage rack 20 and a moving mechanism 21 provided on the top side of the storage rack 20. A section to be guided 16a is provided on the top side of the storage block 16 (see FIGS. 2 and 3).

The storage rack 20 is formed in the shape of a rectangular frame that is hollowed throughout in the longitudinal direction, and has a plurality of storage shelves 20a provided inside the storage rack 20 (see FIGS. 1 and 4). Each one of recording media 100 can be stored on each of the storage shelves 20a.

The moving mechanism 21 has a drive motor 21a, and two pinions 21b (only one of which is shown in FIGS. 1 and 4) that are rotated by the drive force of the drive motor 21a. Each of the pinions 21b is in mesh with each of the first conveyance racks 12.

Figure 2:
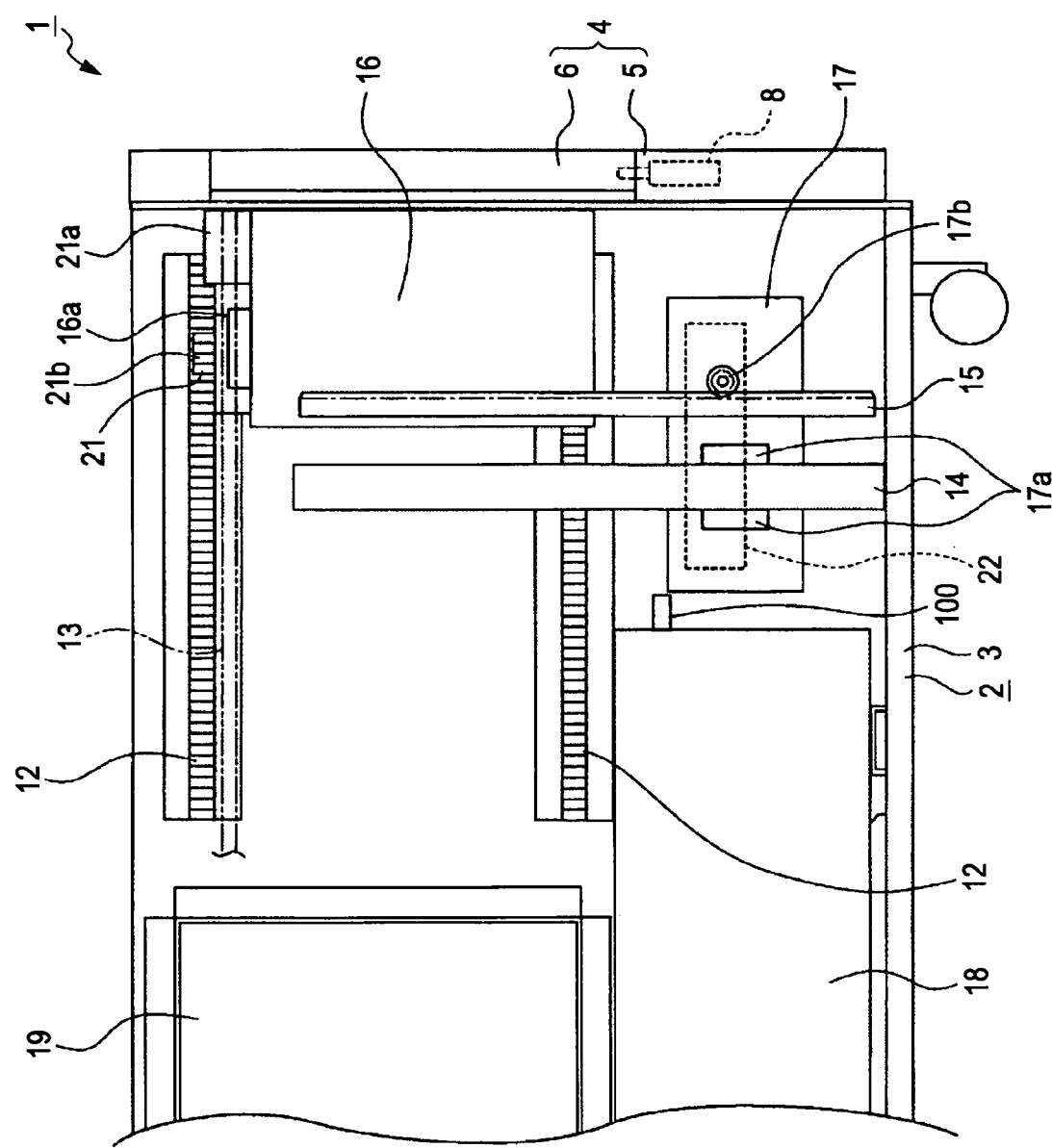
FIG. 2 is a schematic side view of the recording medium changer in a state when a storage block is in a forward position and a conveying block is in a driving delivery position.
Figure 3:
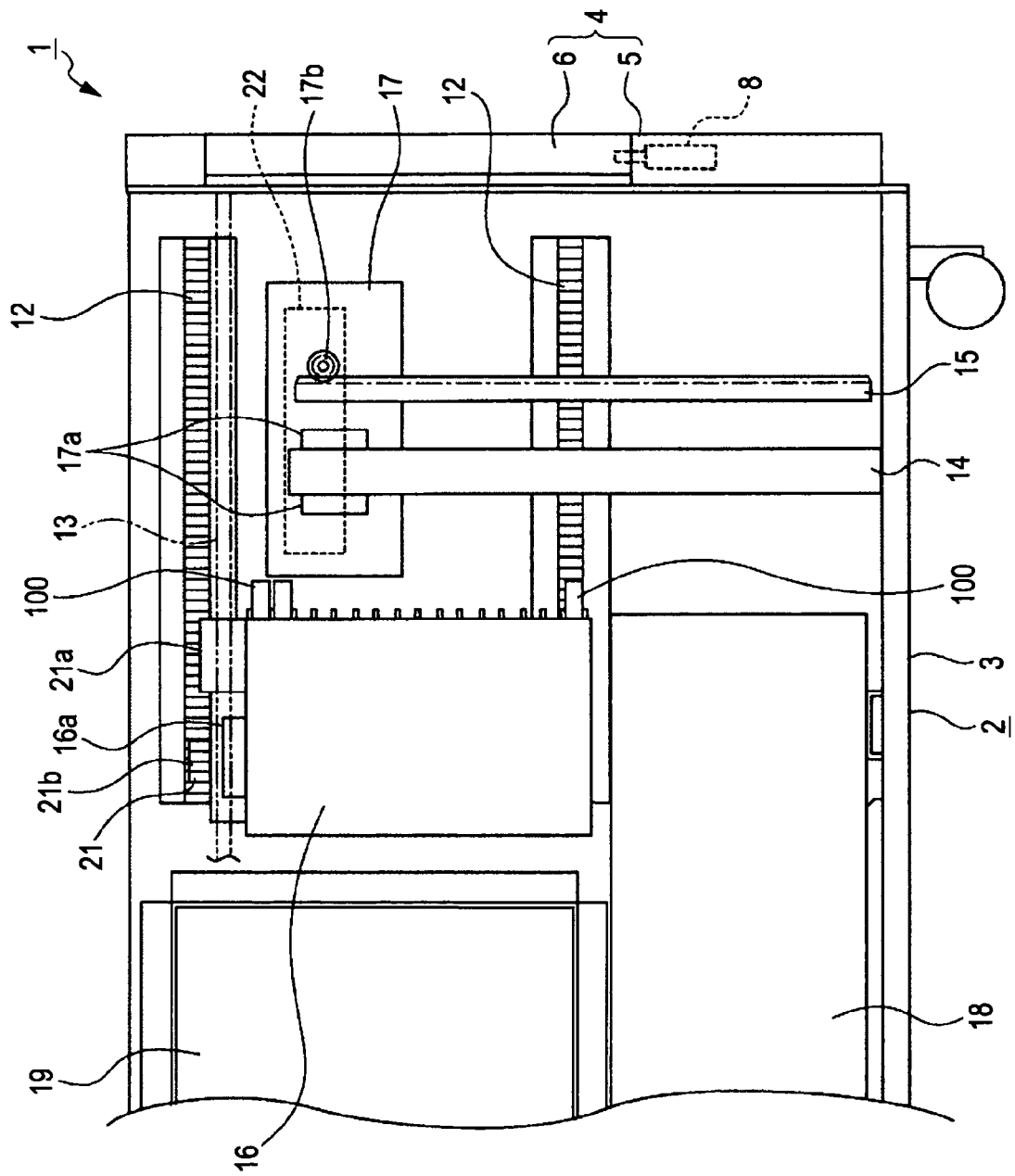
FIG. 3 is a schematic side view of the recording medium changer in a state when the storage block is in a rear position and the conveying block is in a storage delivery position.

The section to be guided 16a of the storage block 16 is supported so as to slide freely on the guide rail 13 (see FIGS. 2 and 3).

As the pinions 21b rotated by the drive force of the drive motor 21a are fed on the first conveyance racks 12, the section to be guided 16a is guided along the guide rail 13, thus causing the storage block 16 to move in the longitudinal direction. The storage block 16 is moved between a forward position as the forward movable end, and a rear position as the rear movable end. When in the forward position, the front end portion of the storage block 16 is inserted into the opening 5a of the door 5 from the rear (see FIG. 4).

The conveying block 17 is movable in the vertical direction at the front end portion inside the outer casing 2.

The conveying block 17 has, on its one side, a section to be guided 17a and a pinion 17b. The section to be guided 17a of the conveying block 17 is supported so as to slide freely on a guide member 14 attached on the inner surface of the main body 3, and the pinion 17b thereof is in mesh with the second conveyance rack 15. Accordingly, when the pinion 17b is rotated by the drive force of a motor (not shown), the section to be guided 17a is guided along the guide member 14 in a direction according to the rotating direction of the pinion 17b, thus causing the conveying block 17 to move in the vertical direction.

A recording medium holding mechanism 22 is provided in the conveying block 17 (see FIGS. 2 and 3). The recording medium holding mechanism 22 has a drive motor (not shown), and a pair of holding arms that can be moved toward and away from each other, for example. The pair of holding arms can be moved in the longitudinal direction.

The conveying block 17 is moved between a storage delivery position as the upper movable end where delivery of the recording medium 100 is performed between the conveying block 17 and the storage block 16, and a driving delivery position as the lower movable end in the direction of movement where delivery of the recording medium 100 is performed between the conveying block 17 and the drive block 18. The storage delivery position as the upper movable end of the conveying block 17, and the forward position as the forward movable end of the storage block 16 overlap each other.

The drive block 18 is arranged in a fixed state in the rear side in the interior of the outer casing 2. The position forward of the drive block 18 is the driving delivery position as the lower movable end of the conveying block 17.

The power supply block 19 is a block that supplies drive power to individual sections arranged inside the outer casing 2, such as the drive motor 21a of the storage block 16 and the motor of the conveying block 17. The power supply block 19 is arranged in a fixed state above the rear half portion of the drive block 18. Thus, a space is formed above the front half portion of the drive block 18. The position of this space is the rear position as the rear movable end of the storage block 16.

Figure 5:
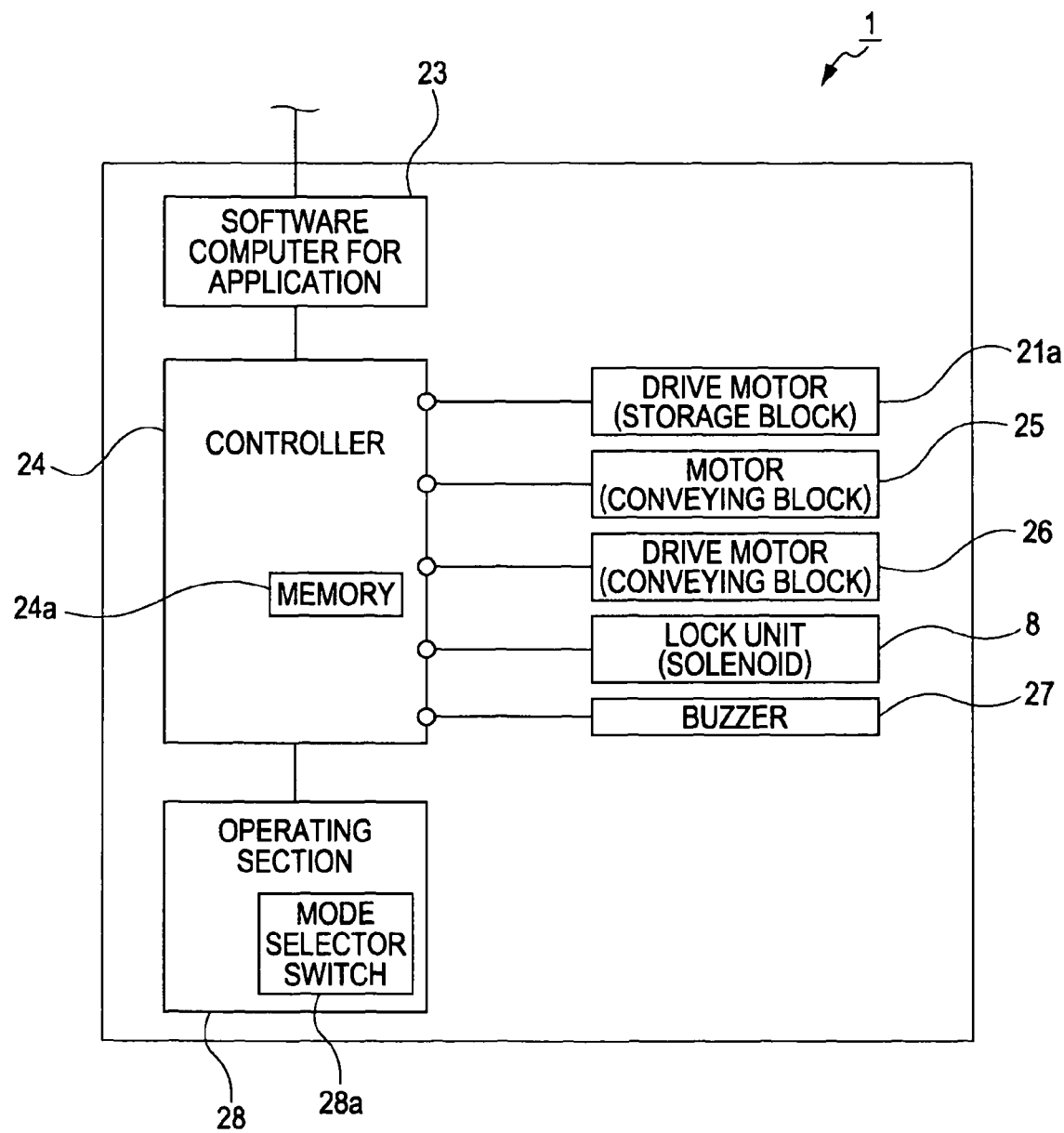
FIG. 5 is a block diagram showing the configuration of the recording medium changer.

As shown in FIG. 5, the recording medium changer 1 has a computer for application software 23 and a controller 24. The computer for application software 23 has a function of starting and controlling application software used for the recording medium changer 1. The computer for application software 23 is connected to the controller 24 that governs the overall control of the recording medium changer 1.

The controller 24 is, for example, a microcomputer, and has a memory 24a. The drive motor 21a, a motor 25, a drive motor 26, the lock unit 8, and a buzzer 27 are controlled by the controller 24. The motor 25 is a drive section for moving the conveying block 17 in the vertical direction. The drive motor 26 is a drive section for actuating the pair of holding arms of the conveying block 17.

In the recording medium changer 1, individual sections are controlled by the controller 24 on the basis of a command from an operating section 28. The operating section 28 is arranged, for example, on the front side of the door member 4, and has a mode selector switch 28a. The mode selector switch 28a serves as, for example, an operating unit for setting the position of the storage block 16 by switching between modes in accordance with the kind of application software used in the recording medium changer 1.

When the open/close door 6 of the recording medium changer 1 has been open for a fixed period of time, for example, an alarm is issued as sound from the buzzer 27.

In the following, the operation of the recording medium changer 1 will be described (see FIGS. 6 through 18).

First, a description will be given of an operation in which the user stores the recording medium 100 into the storage block 16, and after playback or reading of data in the drive block 18 is finished, the user ejects the recording medium 100 from the storage block 16.

In the initial state, for example, the storage block 16 is in the forward position, and the conveying block 17 is in the driving delivery position.

The user turns the open/close door 6 to open the opening 5a. If the open/close door 6 is locked in the close position by the lock unit 8 when trying to open the opening 5a, the unlock button 7 is operated to release the locked state of the open/close door 6.

Figure 6:
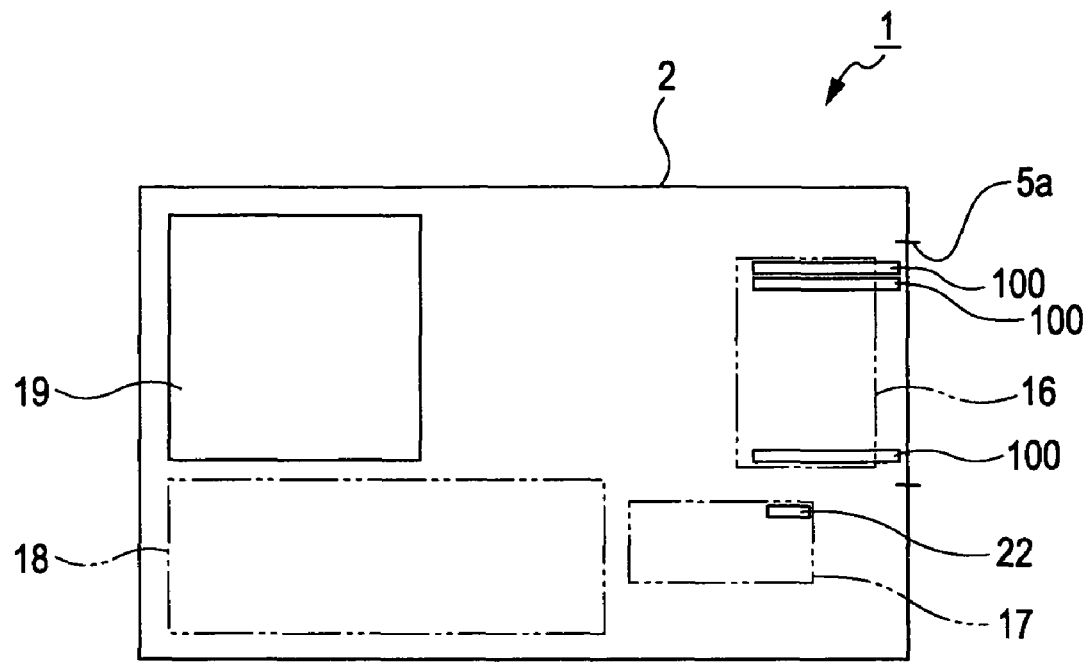
FIG. 6 is a conceptual view showing a state in which a recording medium is stored in the storage block located in the forward position, illustrating an operation of the recording medium changer together with FIGS. 7 through 18.

The user inserts the recording medium 100 for storage into a desired one of the storage shelves 20a in the storage rack 20 of the storage block 16 located in its forward position (see FIG. 6). After finishing the insertion of the recording medium 100 into the storage shelf 20a, the user turns the open/close door 6 to close the opening 5a. The open/close door 6 that has been turned into the close position is locked by the lock unit 8. The locking of the open/close door 6 by the lock unit 8 may be done automatically when the open/close door 6 is turned into the close position, or may be done through a user's manual operation on a lock button that is provided on the operating section 28.

Figure 7:
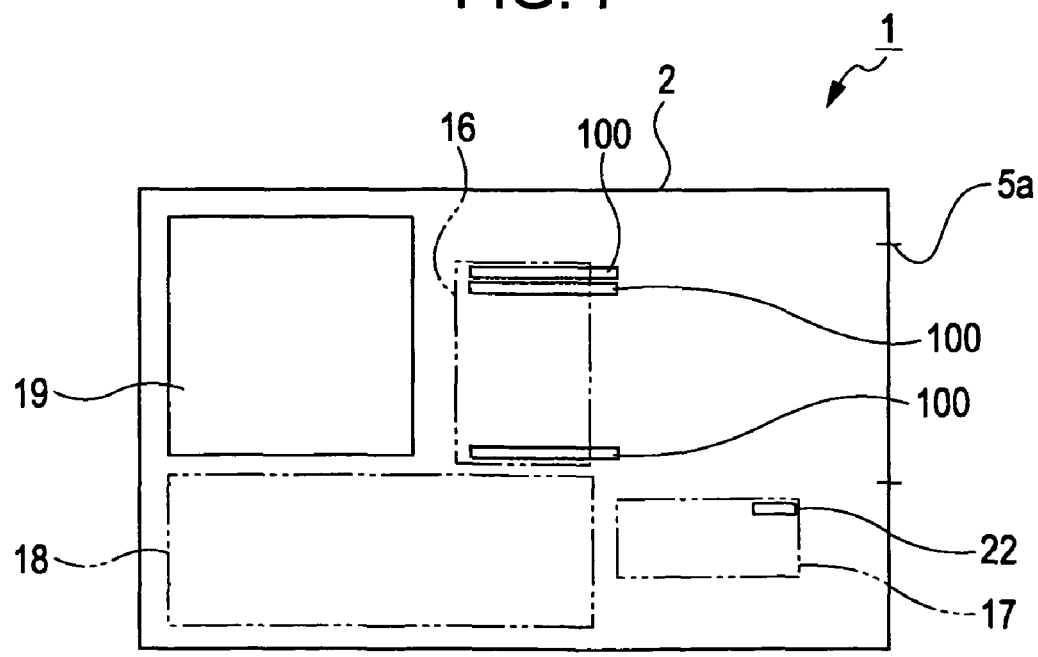
FIG. 7 is a conceptual view, continuous from FIG. 6, showing a state in which the storage block has been moved from the forward position to the rear position.

When, in the state with the recording medium 100 inserted in the storage rack 20, a predetermined operation button on the operating section 28 is operated by the user, the storage block 16 is moved to the rear position (see FIG. 7).

Figure 8:
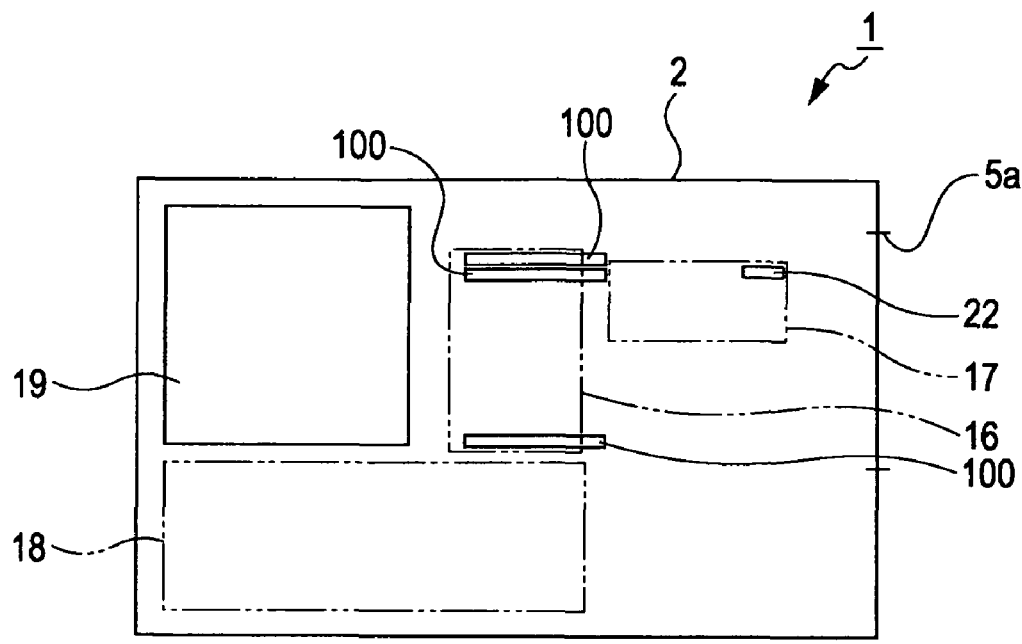
FIG. 8 is a conceptual view, continuous from FIG. 7, showing a state in which the conveying block has been moved from the driving delivery position to the storage delivery position.

When the storage block 16 has been moved to the rear position, subsequently, the conveying block 17 is moved from the driving delivery position to the storage delivery position (see FIG. 8). The timing of starting the operation of moving the conveying block 17 from the driving delivery position to the storage delivery position may be during the movement of the storage block 16 toward the rear position, as long as the conveying block 17 does not come into interference with the storage block 16 being moved toward the rear position.

Figure 9:
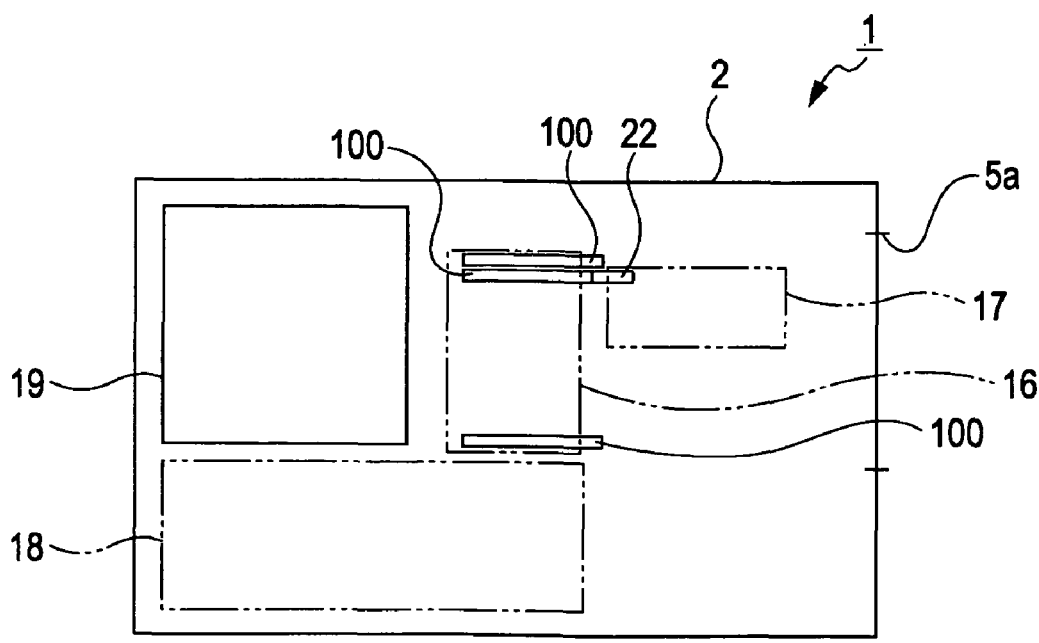
FIG. 9 is a conceptual view, continuous from FIG. 8, showing a state in which the recording medium is being ejected from the storage block by a recording medium holding mechanism.
Figure 10:
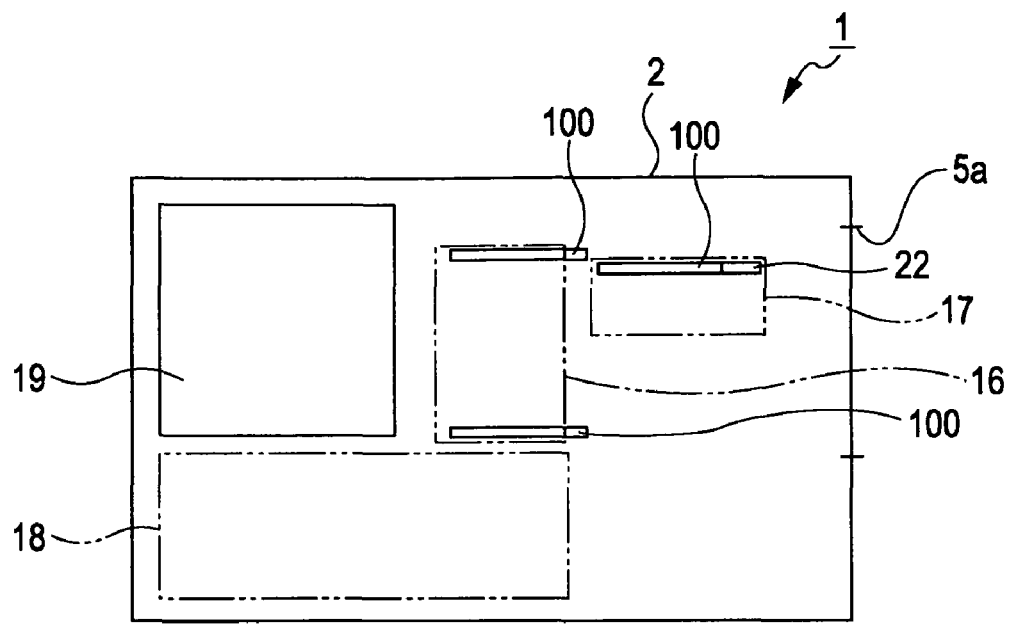
FIG. 10 is a conceptual view, continuous from FIG. 9, showing a state in which the recording medium has been ejected from the storage block by the recording medium holding mechanism.

Subsequently, the recording medium holding mechanism 22 of the conveying block 17 is moved rearward to hold the recording medium 100 stored in the storage block 16 (see FIG. 9). The recording medium holding mechanism 22 is moved forward, so the recording medium 100 is drawn out from the storage rack 20 of the storage block 16 (see FIG. 10).

Figure 11:
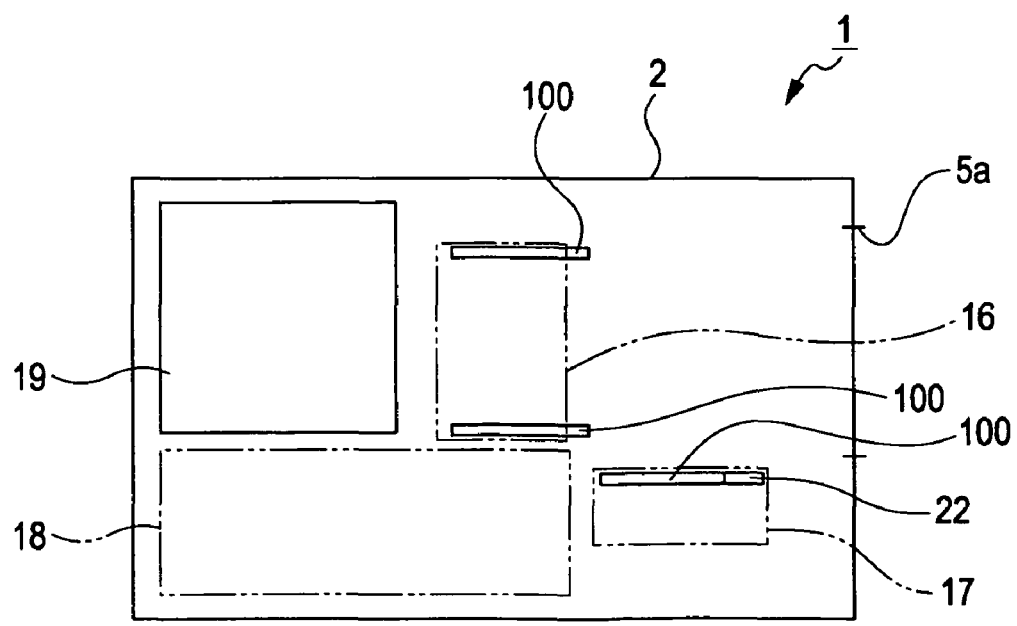
FIG. 11 is a conceptual view, continuous from FIG. 10, showing a state in which the conveying block has been moved from the storage delivery position to the driving delivery position.

Then, the conveying block 17 is moved from the storage delivery position to the driving delivery position (see FIG. 11).

Figure 12:
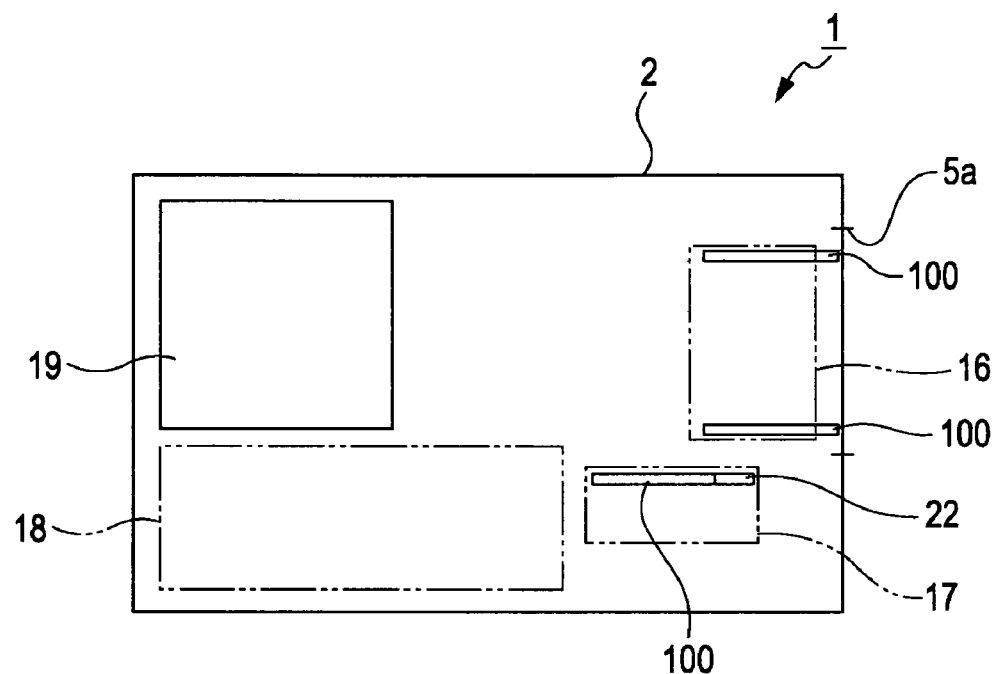
FIG. 12 is a conceptual view, continuous from FIG. 11, showing a state in which the storage block has been moved from the rear position to the forward position.

When the conveying block 17 has been moved to the drive delivery position, subsequently, the storage block 16 is moved from the rear position to the forward position (see FIG. 12). The timing of starting the operation of moving the storage block 16 from the rear position toward the forward position may be during the movement of the conveying block 17 toward the driving delivery position, as long as the storage block 16 does not come into interference with the conveying block 17 being moved toward the driving delivery position.

Figure 13:
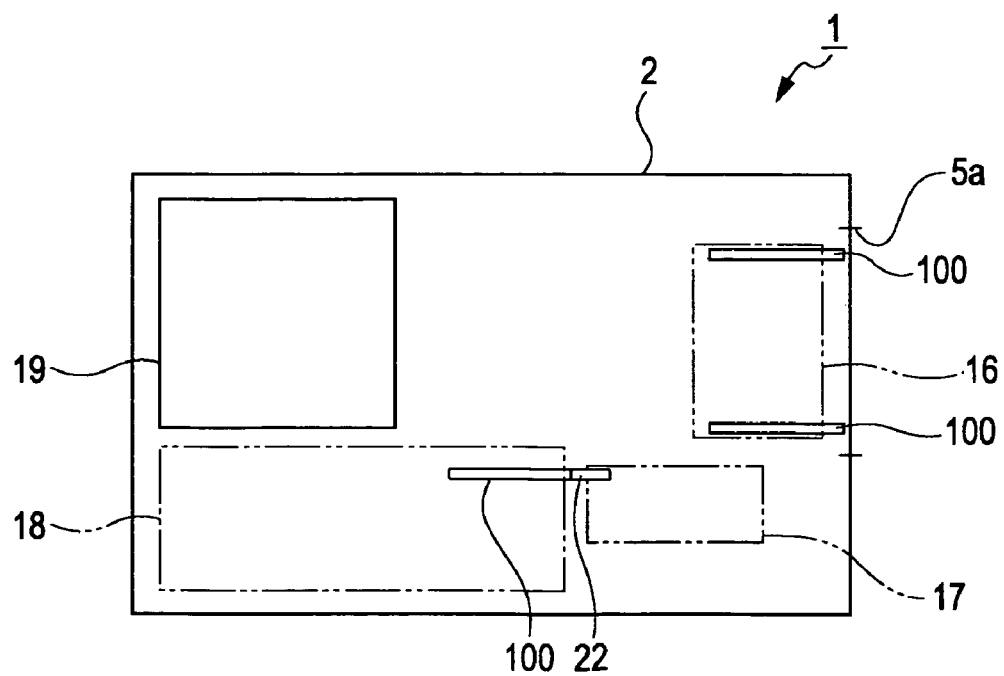
FIG. 13 is a conceptual view, continuous from FIG. 12, showing a state in which the recording medium is being mounted onto a drive block by the recording medium holding mechanism.
Figure 14:
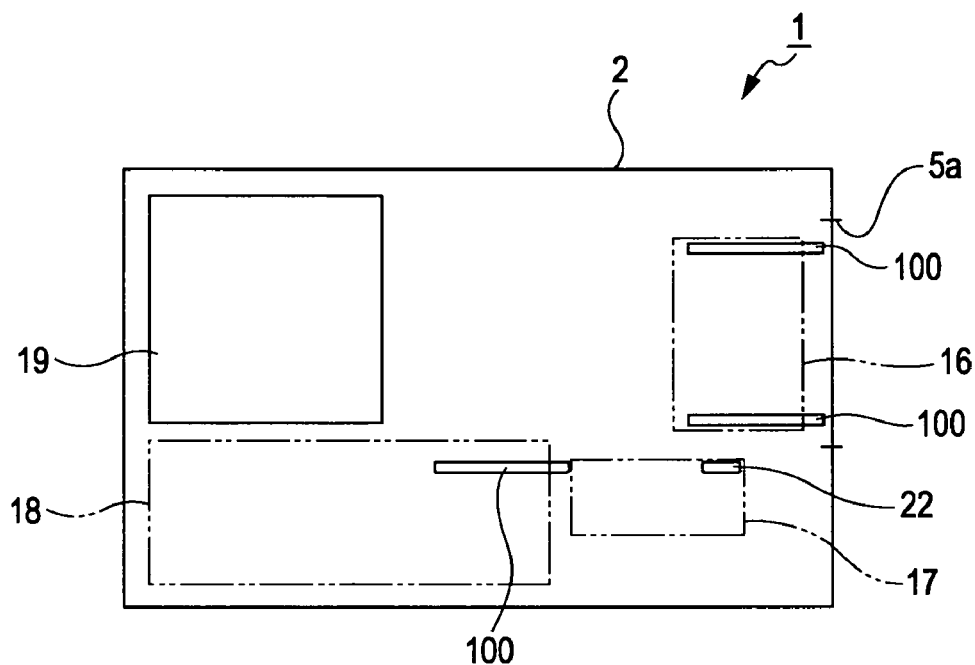
FIG. 14 is a conceptual view, continuous from FIG. 13, showing a state in which the recording medium has been mounted onto the drive block by the recording medium holding mechanism.

When the conveying block 17 has been moved to the driving delivery position, the recording medium holding mechanism 22 is moved rearward to mount the recording medium 100 on the drive block 18 (see FIG. 13). Upon mounting the recording medium 100 on the drive block 18, the recording medium holding mechanism 22 is moved forward to be located inside the conveying block 17 again (see FIG. 14). The operation of mounting the recording medium 100 on the drive block 18 by the recording medium holding mechanism 22 may be performed during the movement of the storage block 16 from the rear position toward the forward position.

At this time, since the storage block 16 has been moved to the forward position, the user turns the open/close door 6 to open the opening 5a, thus allowing storage of the other recording media 100 into the storage shelves 20a and ejection of the other recording media 100 from the storage shelves 20a.

In the drive block 18, data recorded on the recording medium 100 is played back or read. The data recorded on the recording medium 100 thus read by the drive block 18 is uploaded to a storage unit of an external device (not shown), for example, a hard disk or a memory.

Figure 15:
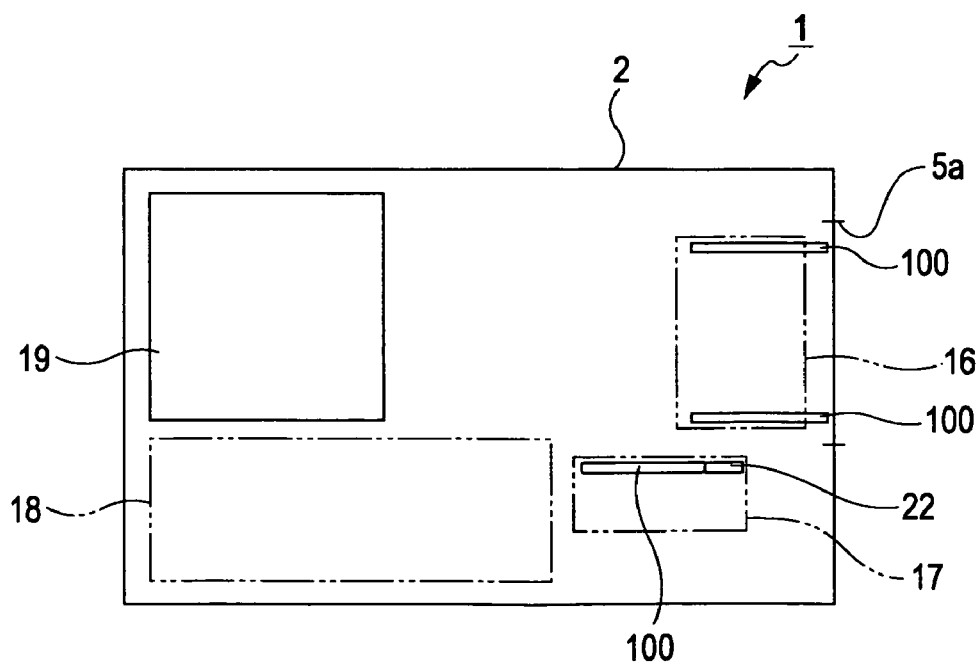
FIG. 15 is a conceptual view, continuous from FIG. 14, showing a state in which the recording medium has been ejected from the drive block by the recording medium holding mechanism.

When the playback or reading of data on the recording medium 100 in the drive block 18 is finished, the recording medium holding mechanism 22 is actuated again to eject the recording medium 100 from the drive block 18 and hold the ejected recording medium 100 (see FIG. 15).

Figure 16:
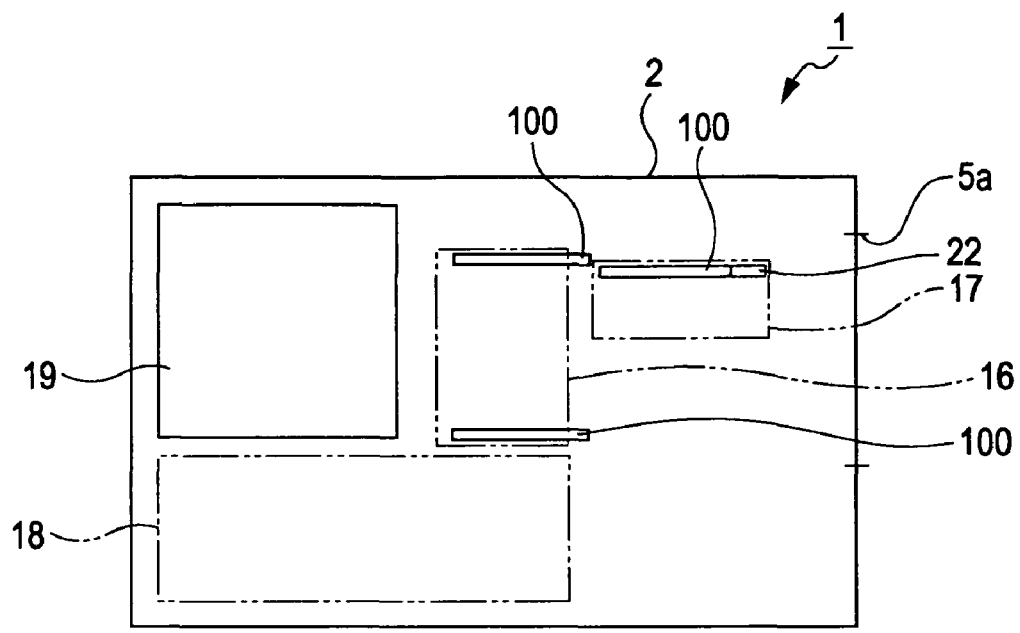
FIG. 16 is a conceptual view, continuous from FIG. 15, showing a state in which the conveying block has been moved from the driving delivery position to the storage delivery position.

When the recording medium 100 has been ejected from the drive block 18 by the recording medium holding mechanism 22, the storage block 16 is moved from the forward position to the rear position, and the conveying block 17 is moved from the driving delivery position to the storage delivery position (see FIG. 16).

Figure 17:
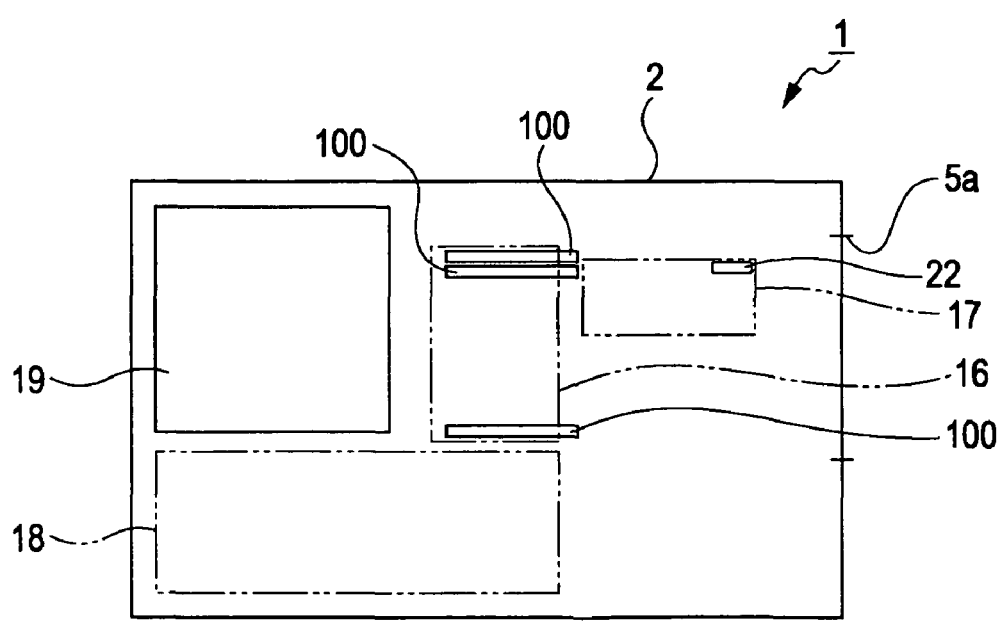
FIG. 17 is a conceptual view, continuous from FIG. 16, showing a state in which the recording medium has been stored into the storing block by the recording medium holding mechanism.

When the conveying block 17 has been moved to the storage delivery position, the recording medium 100 is stored into the storage rack 20 of the storing block 16 located in its rear position, by the recording medium holding mechanism 22 (see FIG. 17).

Figure 18:
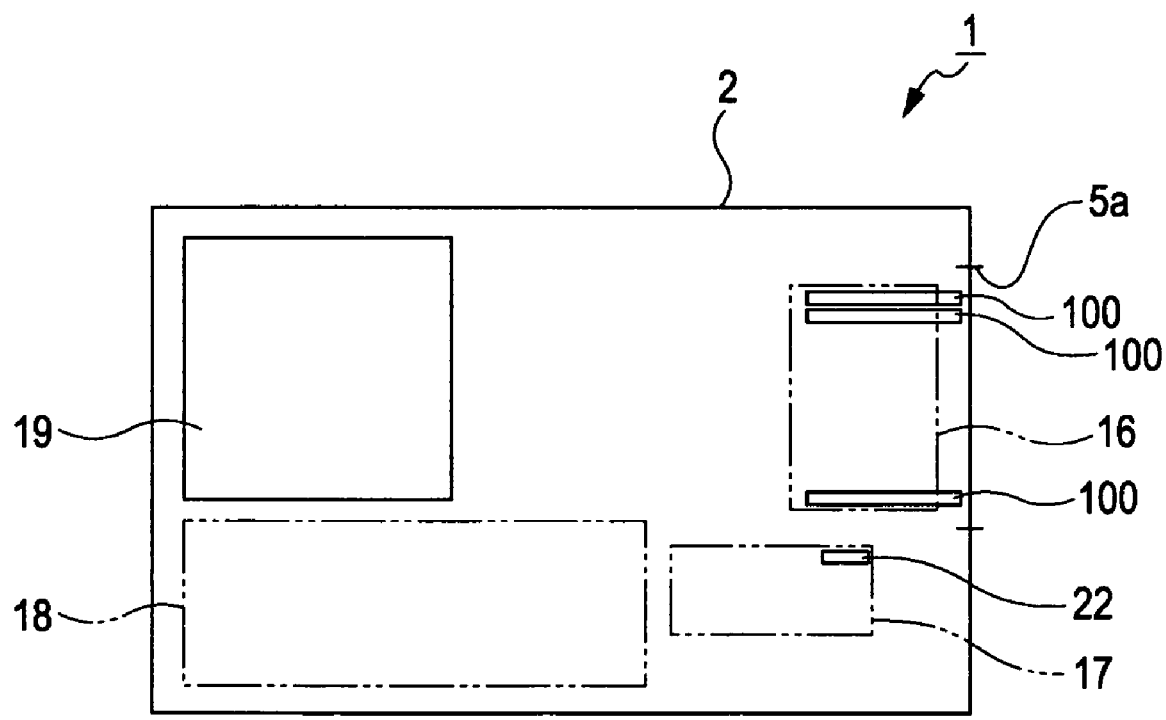
FIG. 18 is a conceptual view, continuous from FIG. 17, showing a state in which the storage block has been moved from the rear position to the forward position.

Subsequently, the conveying block 17 is moved from the storage delivery position to the driving delivery position, and the storage block 16 is moved from the rear position to the forward position (see FIG. 18). The user can turn the open/close door 6 to open the opening 5a, and eject the recording medium 100 from the storage rack 20.

As mentioned above, by making a setting such that the storage block 16 is present in the forward position when the conveying block 17 is present in the driving delivery position, ejection and storage of the recording medium 100 from and into the storage block 16 can be performed immediately, thereby achieving a reduction in the working time necessary for the ejection and storage work.

Next, operations of the recording medium changer 1 according to the modes being set will be described (see FIGS. 19 through 21B). As mentioned above, the recording medium changer 1 is provided with the mode selector switch 28a, and switching between modes can be done by operating the mode selector switch 28a. Also, the recording medium changer 1 is provided with the computer for application software 23, and switching between modes can be also done automatically in accordance with the application software used.

In the recording medium changer 1, for example, a mode is set in accordance with the application software, and the following mode settings are available: Mode A corresponding to application software that involves frequent storage and ejection of the recording medium 100 into and from the storage block 16; Mode B corresponding to application software that involves frequent reading of data from the same recording medium 100; and Mode C corresponding to application software that involves frequent storage and ejection of the recording medium 100 into and from the storage block 16 and also frequent reading of data from the same recording medium 100.

Figure 19:
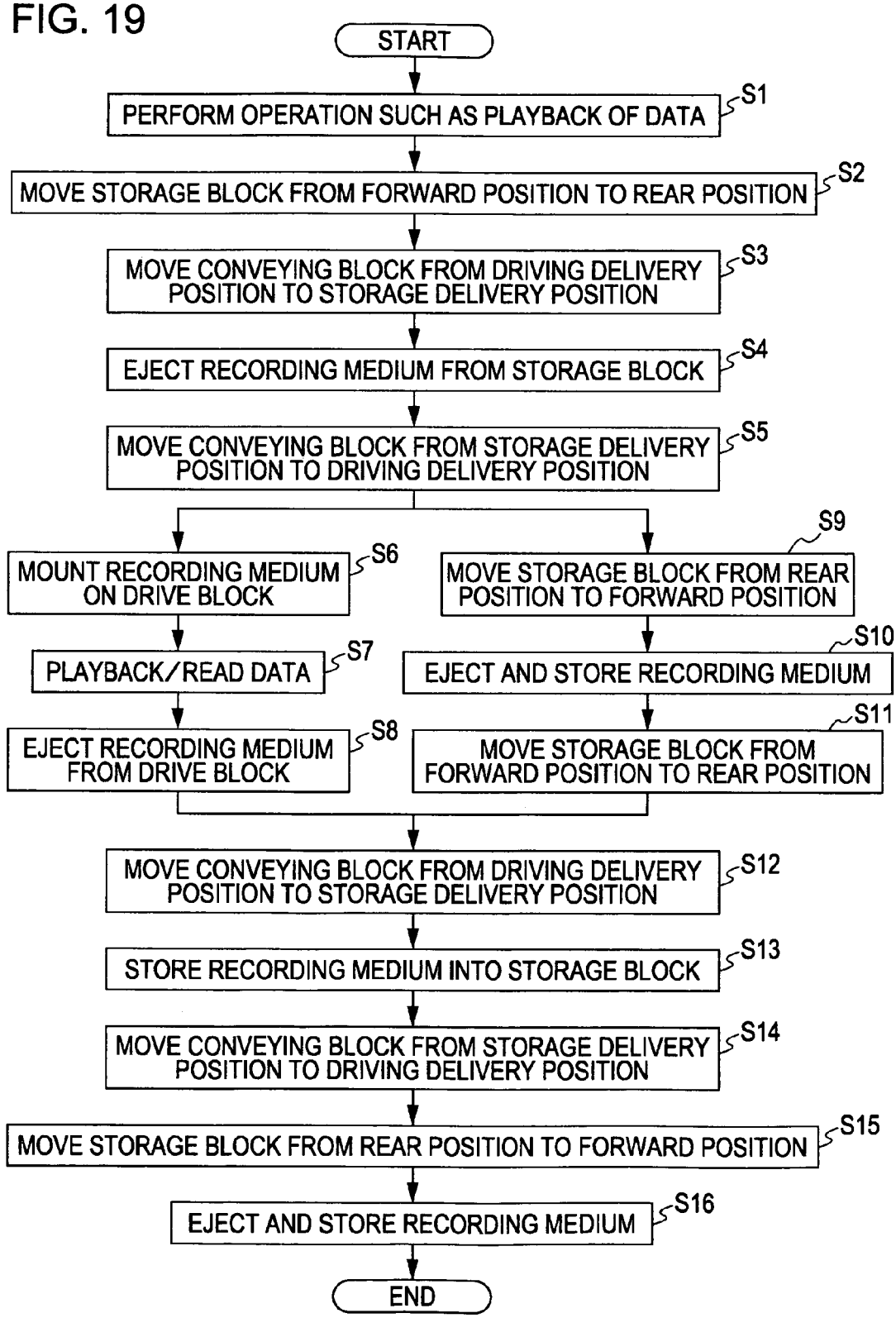
FIG. 19 is a flowchart showing an operation when Mode A is set.

First, operation in Mode A will be described (see FIG. 19).

(S1) An operation is made on the operating section 28 to perform playback or reading, or both playback and reading of data recorded on the recording medium 100 stored in the storage rack 20 of the storage block 16. At this time, the storage block 16 is in the forward position, and the conveying block 17 is in the driving delivery position.

(S2) The storage block 16 is moved from the forward position to the rear position on the basis of the operation in (S1).

(S3) The conveying block 17 is moved from the driving delivery position to the storage delivery position.

(S4) The recording medium 100 is ejected from the storage block 16 and held by the recording medium holding mechanism 22 of the conveying block 17.

(S5) The conveying block 17 is moved from the storage delivery position to the driving delivery position.

(S6) The recording medium 100 is mounted onto the drive block 18 by the recording medium holding mechanism 22.

(S7) Playback or reading, or both playback and reading of data recorded on the recording medium 100 are performed in the drive block 18.

(S8) The recording medium 100 from which data has been played back or read is ejected by the recording medium holding mechanism 22.

(S9) On the other hand, when the movement of the conveying block 17 from the storage delivery position to the driving delivery position has been performed, the storage block 16 is moved from the rear position to the forward position.

(S10) The user turns the open/close door 6 to open the opening 5*a*, and performs ejection and storage of the recording medium 100 from and into the storage block 16. As mentioned above, in the recording medium changer 1, the storage block 16 is moved from the rear position to the forward position when the conveying block 17 has been moved from the storage delivery position to the driving delivery position. Thus, ejection and storage of the recording medium 100 into and from the storage block 16 can be performed immediately when the opening 5*a* is opened, thereby achieving an improvement in the usability of the recording medium changer 1 through a reduction in work wait time.

(S11) The storage block 16 is moved from the forward position to the rear position. The movement of the storage block 16 from the forward position to the rear position may be done while the recording medium 100 from which data has been played back or read is ejected by the recording medium holding mechanism 22. In this way, by moving the storage block 16 from the forward position to the rear position while the recording medium 100 from which data has been played back or read is ejected by the recording medium holding mechanism 22, it is possible to achieve a reduction in operating time through an improvement in operating efficiency.

The ejection of the recording medium 100 from which data has been played back or read by the recording medium holding mechanism 22 may be performed during or before the movement of the storage block 16 from the forward position to the rear position. By performing the ejection of the recording medium 100 during or before the movement of the storage block 16 in this way, it is possible to achieve a reduction in operating time through an improvement in operating efficiency.

(S12) Subsequent to (S8) or (S11), the conveying block 17 is moved from the driving delivery position to the storage delivery position.

(S13) The recording medium 100 is stored into the storage rack 20 of the storage block 16 by the recording medium holding mechanism 22.

(S14) The conveying block 17 is moved from the storage delivery position to the driving delivery position.

(S15) The storage block 16 is moved from the rear position to the forward position.

(S16) The user turns the open/close door 6 to open the opening 5*a*, and performs ejection and storage of the mounting medium 100 from and into the storage block 16.

Figure 20A:
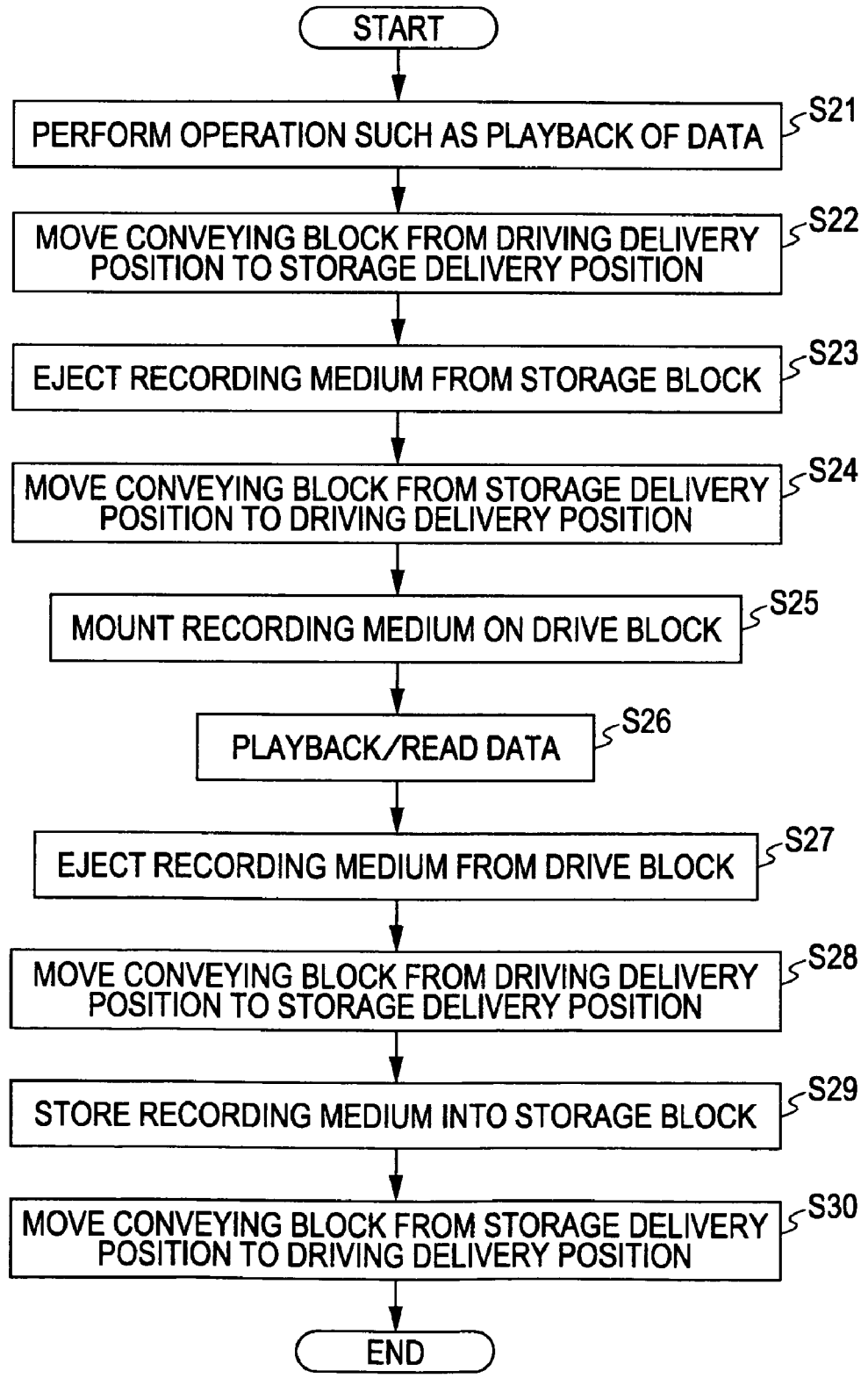
FIGS. 20A and 20B are each a flowchart showing an operation when Mode B is set.
Figure 20B:
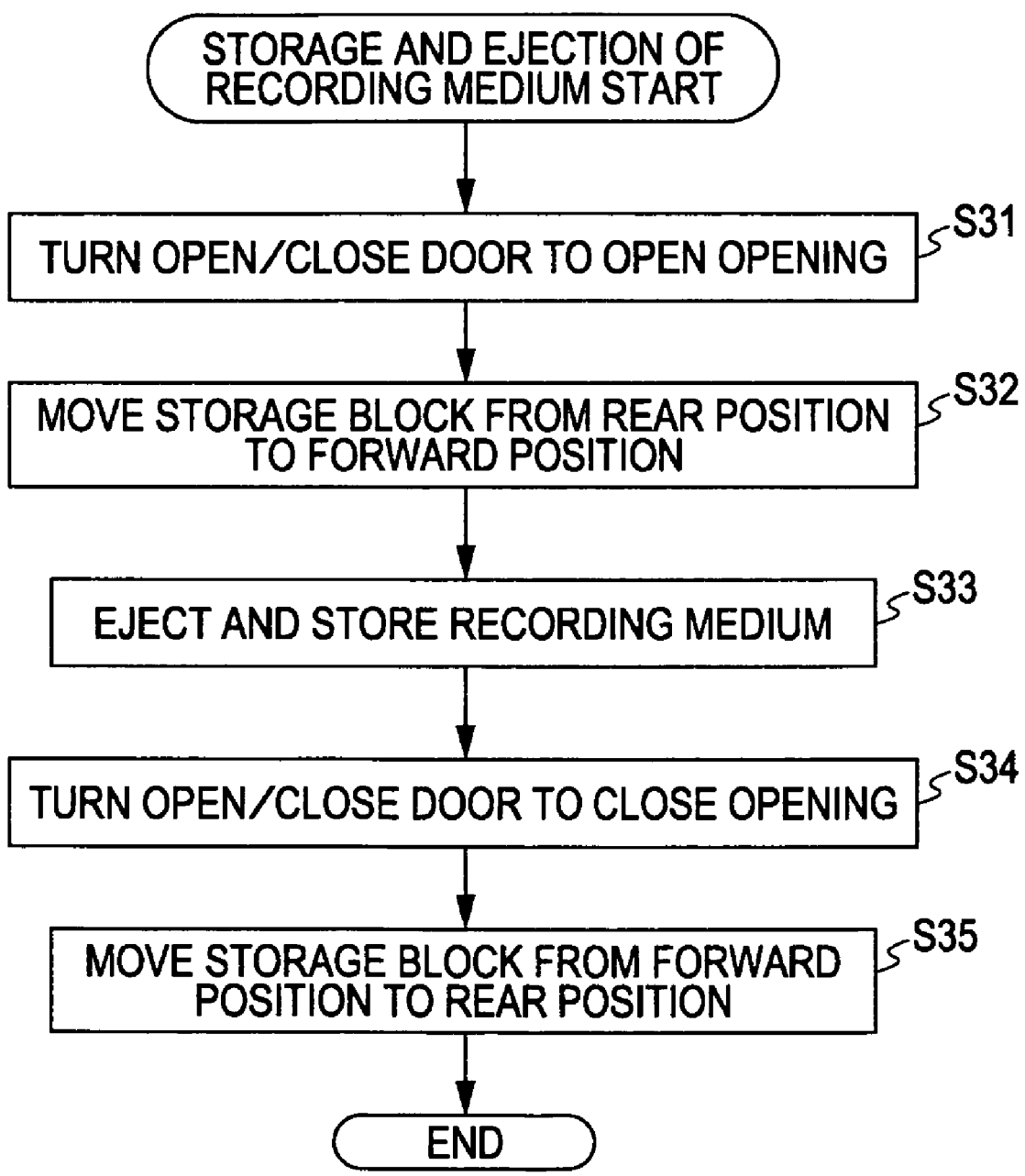

Next, operation in Mode B will be described (see FIGS. 20A and 20B).

(S21) An operation is made on the operating section 28 to perform playback or reading, or both playback and reading of data recorded on the recording medium 100 stored in the storage rack 20 of the storage block 16. At this time, the storage block 16 is in the rear position, and the conveying block 17 is in the driving delivery position.

(S22) The conveying block 17 is moved from the driving delivery position to the storage delivery position.

(S23) The recording medium 100 is ejected from the storage block 16 and held by the recording medium holding mechanism 22 of the conveying block 17.

(S24) The conveying block 17 is moved from the storage delivery position to the driving delivery position.

(S25) The recording medium 100 is mounted onto the drive block 18 by the recording medium holding mechanism 22.

(S26) Playback or reading, or both playback and reading of data recorded on the recording medium 100 are performed in the drive block 18.

(S27) The recording medium 100 from which data has been played back or read is ejected by the recording medium holding mechanism 22.

(S28) The conveying block 17 is moved from the driving delivery position to the storage delivery position.

(S29) The recording medium 100 is stored into the storage rack 20 of the storage block 16 by the recording medium holding mechanism 22.

(S30) The conveying block 17 is moved from the storage delivery position to the driving delivery position.

Although storage and ejection of the recording medium 100 from and into the storage block 16 are not frequently performed in Mode B, when storage and ejection of the recording medium 100 from and into the storage block 16 are performed, the storage and ejection are performed in accordance with (S31) through (S35) below.

(S31) The user operates the unlock button 7 to release the locking of the open/close door 6 in the close position, and turns the open/close door 6 to open the opening 5*a*. At this time, the storage block 16 is in the rear position, and the conveying block 17 is in the driving delivery position.

(S32) The storage block 16 is moved from the rear position to the forward position.

(S33) The user performs ejection and storage of the recording medium 100 from and into the storage block 16.

(S34) The user turns the open/close door 6 to close the opening 5*a*. The open/close door 6 is locked in the close position.

(S35) The storage block 16 is moved from the forward position to the rear position.

Figure 21A:
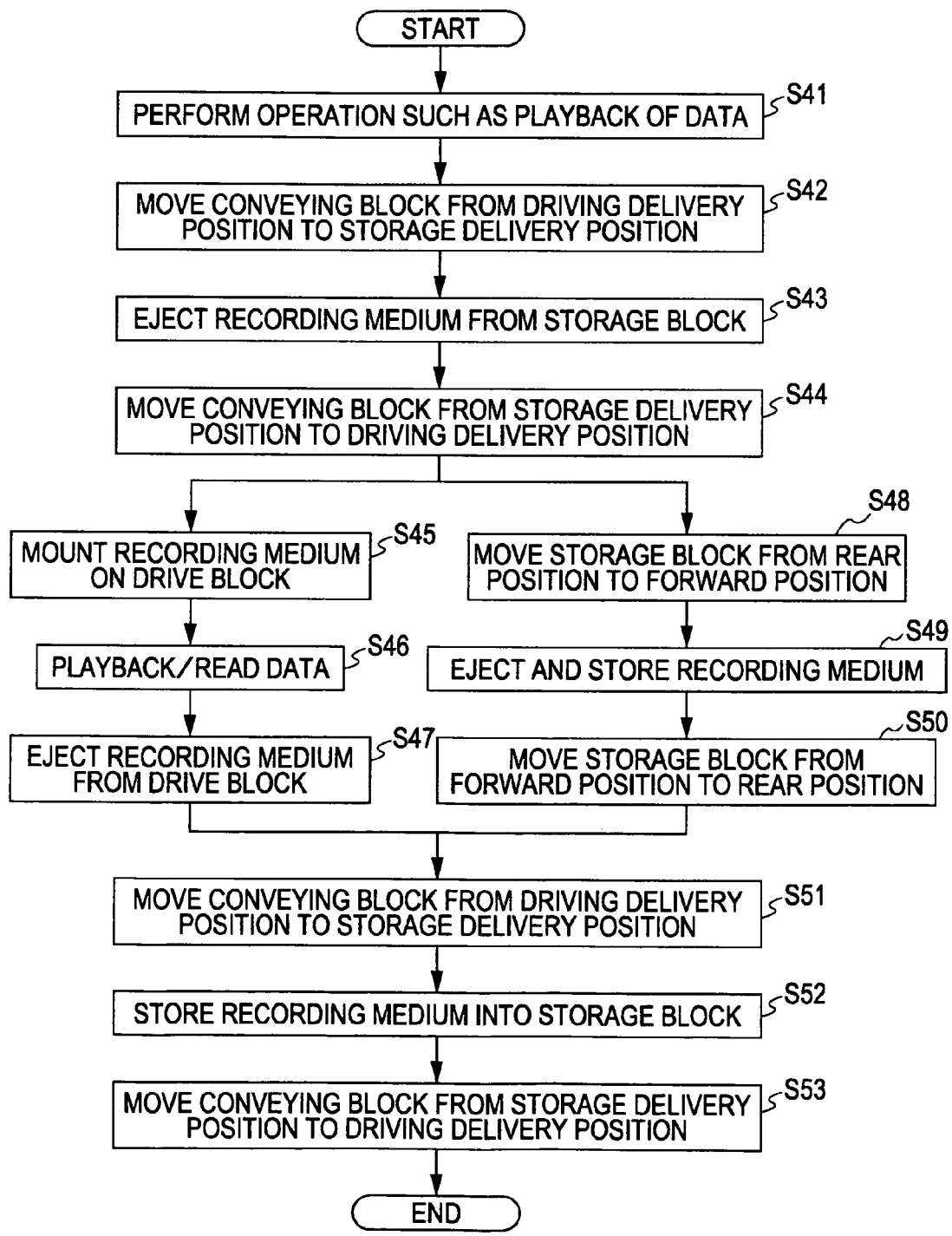

Next, operation in Mode C will be described (see FIGS. 21A and 21B).

(S41) An operation is made on the operating section 28 to perform playback or reading, or both playback and reading of data recorded on the recording medium 100 stored in the storage rack 20 of the storage block 16. At this time, the storage block 16 is in the rear position, and the conveying block 17 is in the driving delivery position.

(S42) The conveying block 17 is moved from the driving delivery position to the storage delivery position.

(S43) The recording medium 100 is ejected from the storage block 16 and held by the recording medium holding mechanism 22 of the conveying block 17.

(S44) The conveying block 17 is moved from the storage delivery position to the driving delivery position.

(S45) The recording medium 100 is mounted onto the drive block 18 by the recording medium holding mechanism 22.

(S46) Playback or reading, or both playback and reading of data recorded on the recording medium 100 are performed in the drive block 18.

(S47) The recording medium 100 from which data has been played back or read is ejected by the recording medium holding mechanism 22.

(S48) On the other hand, when the movement of the conveying block 17 from the storage delivery position to the driving delivery position has been performed, the storage block 16 is moved from the rear position to the forward position.

(S49) The user turns the open/close door 6 to open the opening 5a, and performs ejection and storage of the mounting medium 100 from and into the storage block 16.

(S50) The storage block 16 is moved from the forward position to the rear position.

(S51) Subsequent to (S47) or (S50), the conveying block 17 is moved from the driving delivery position to the storage delivery position.

(S52) The recording medium 100 is stored into the storage rack 20 of the storage block 16 by the recording medium holding mechanism 22.

(S53) The conveying block 17 is moved from the storage delivery position to the driving delivery position.

When storage and ejection of the recording medium 100 from and into the storage block 16 are performed in Mode C, the storage and ejection are performed in accordance with (S54) through (S58) below.

(S54) The user operates the unlock button 7 to release the locking of the open/close door 6 in the close position, and turns the open/close door 6 to open the opening 5a. At this time, the storage block 16 is in the rear position, and the conveying block 17 is in the driving delivery position.

(S55) The storage block 16 is moved from the rear position to the forward position.

(S56) The user performs ejection and storage of the recording medium 100 from and into the storage block 16.

(S57) The user turns the open/close door 6 to close the opening 5a. The open/close door 6 is locked in the close position.

(S58) The storage block 16 is moved from the forward position to the rear position.

As mentioned above, according to the recording medium changer 1, when the conveying block 17 is present in the driving delivery position, the storage block 16 is present in the forward position or in the rear position in accordance with the mode being set (Mode A, B, or C), thereby achieving an improvement in usability according to the mode being set.

As described above, according to the recording medium changer 1, the storage block 16 is movable in the longitudinal direction on the side above the drive block 18, and the conveying block 17 is movable in the vertical direction on the side forward of the drive block 18.

Therefore, since the storage block 16, the conveying block 17, and the drive block 18 are not arranged side by side along the longitudinal direction, the depth dimension of the recording changer 1 does not increase and thus miniaturization can be achieved.

Since the storage block 16 is present in the forward position at the time when storage and ejection of the recording medium 100 into and from the storage block 16 are performed via the opening 5a, it is possible to achieve an improvement in workability at the time of the storage and ejection work of a recording medium into and from the storage block.

Further, since the peek window 10 is provided in the open/close door 6, the state inside the outer casing 2 can be viewed in a state with the open/close door 6 located in the close position, allowing the current operating state to be checked easily.

The recording medium changer 1 may be configured such that when the storage block 16 is present in the rear position, the open/close door 6 is automatically locked in the close position by the lock unit 8, and when the storage block 16 is present in the forward position, the locking of the open/close door 6 by the lock unit 8 is automatically released.

Since locking or unlocking is automatically done in accordance with the position of the storage block 16 in this way, it is not necessary for the user to manually perform an operation related to locking in accordance with the position of the storage block 16, allowing for improved convenience.

While the above description is directed to the case in which the storage block 16 is movable in the longitudinal direction, and the conveying block 17 is movable in the vertical direction, the present invention can be also applied to a case in which the storage block 16 is movable in the longitudinal direction and the conveying block 17 is movable in the lateral direction. Accordingly, in this case, the conveying block 17 is movable in the lateral direction immediately in rear of the door member 4 inside the outer casing 2, with one movable end in the lateral direction serving as the storage delivery position and the other movable end serving as the driving delivery position.

The specific shapes and structures of the individual sections described in the above-mentioned embodiment all represent merely an example of embodiment for implementing the present invention, and these should not be construed as limiting the scope of the present invention.

What is claimed is:

1. A recording medium changer comprising:
   an outer casing having in its front side portion an opening for storage and ejection of a recording medium;
   a storage block that has a plurality of storage shelves each storing the recording medium, and is movable in a longitudinal direction inside the outer casing;
   a drive block on which the recording medium is mounted and which processes data recorded on the recording medium;
   a conveying block that is movable in a vertical direction or in a lateral direction inside the outer casing, and ejects the recording medium from the storage block or the drive block and conveys the ejected recording medium for mounting onto the drive block or for storage into the storage block; and
   a power supply block that supplies drive power to at least individual sections arranged inside the outer casing, wherein
   the storage block is moved between a forward position as a movable end on a forward side in a direction of movement where storage and ejection of the recording medium into and from each of the storage shelves are performed via the opening, and a rear position as a movable end on a rear side in the direction of movement,
   the conveying block is moved between a storage delivery position as a movable end on an upper side or on one lateral side in a direction of movement where delivery of the recording medium is performed between the conveying block and the storage block, and a driving delivery position as a movable end on a lower side or on the other lateral side in the direction of movement where delivery of the recording medium is performed between the conveying block and the drive block, the rear position of the storage block is present above or beside the drive block, the driving delivery position of the conveying block is present forward of the drive block, the conveying block is present in the driving delivery position at the time of movement of the storage block in the longitudinal direction, and the storage block is present in the forward position when storage and ejection of the recording medium into and from the storage block are performed via the opening.

2. The recording medium changer according to claim 1, wherein:

when the conveying block is present in the driving delivery position, the storage block is present in the forward position.

3. The recording medium changer according to claim 1, wherein:

when the conveying block is present in the driving delivery position, the storage block is present in the forward position or in the rear position in accordance with a mode being set.

4. The recording medium changer according to claim 1, wherein:

when processing of data recorded on the recording medium is being performed by the drive block, the storage block is present in the forward position; and when delivery of the recording medium on which processing of data by the drive block has been completed is being performed between the drive block and the conveying block, the storage block is moved from the forward position to the rear position.

5. The recording medium changer according to claim 1, wherein:

when the conveying block has been moved from the storage delivery position to the driving delivery position, the storage block is moved from the rear position to the forward position.

6. The recording medium changer according to claim 1, wherein:

delivery of the recording medium on which processing of data by the drive block has been completed from the drive block to the conveying block is performed during or before movement of the storage block from the forward position to the rear position.

7. The recording medium changer according to claim 1, further comprising:

an open/close door that is moved between an open position for opening the opening, and a close position for closing the opening, wherein the open/close door has a peek window that is located opposite the opening when in the close position.

8. The recording medium changer according to claim 7, further comprising:

lock means for restricting opening of the open/close door, wherein the open/close door is locked in the close position when the storage block is present in the rear position, and locking of the open/close door by the lock means is released when the storage block is present in the forward position.

* * * * *